United States Patent

Parsey et al.

[11] Patent Number: 5,850,998
[45] Date of Patent: Dec. 22, 1998

[54] METHOD AND APPARATUS FOR MOUNTING AN ACCESSORY ON AN APPLIANCE

[75] Inventors: Timothy J. Parsey, Palo Alto; Daniel J. Coster, San Francisco; Elizabeth B. Swan, Woodside; David V. Hoenig, Los Gatos; John J. O'Brien; Susanne M. Pierce, both of San Francisco, all of Calif.

[73] Assignee: Apple Computer, Inc., Cupertino, Calif.

[21] Appl. No.: 627,835

[22] Filed: Apr. 2, 1996

[51] Int. Cl.⁶ .................................................. A47B 96/06
[52] U.S. Cl. .............................. 248/223.21; 248/297.12; 248/918
[58] Field of Search ................................. 248/442.2, 243, 248/223.21, 297.21, 918

[56] References Cited

U.S. PATENT DOCUMENTS

| | | | |
|---|---|---|---|
| 2,569,622 | 10/1951 | Trainor | 248/297.21 |
| 4,693,443 | 9/1987 | Drain | 248/442.2 |
| 4,826,115 | 5/1989 | Novitski | 248/243 |
| 5,615,854 | 4/1997 | Nomura et al. | 248/918 |

*Primary Examiner*—Leslie A. Braun
*Assistant Examiner*—Gwendolyn Boxter
*Attorney, Agent, or Firm*—Mark A. Aaker

[57] ABSTRACT

An integrated mounting solution provides a plurality of mounting connections in close proximity to the appliance, and one or more appliances with a compatible, mating mounting connection. In a preferred form, the mounting connections are integrated with the appliance and may take the form of a series of hole, or perhaps projections. In a particularly preferred form, the mounting connections are a series of holes arranged vertically and positioned in a recess designed into the appliance so that the mounting connections are not a prominent aspect of the visual impact of the appliance, yet are readily available for securing an accessory.

4 Claims, 6 Drawing Sheets

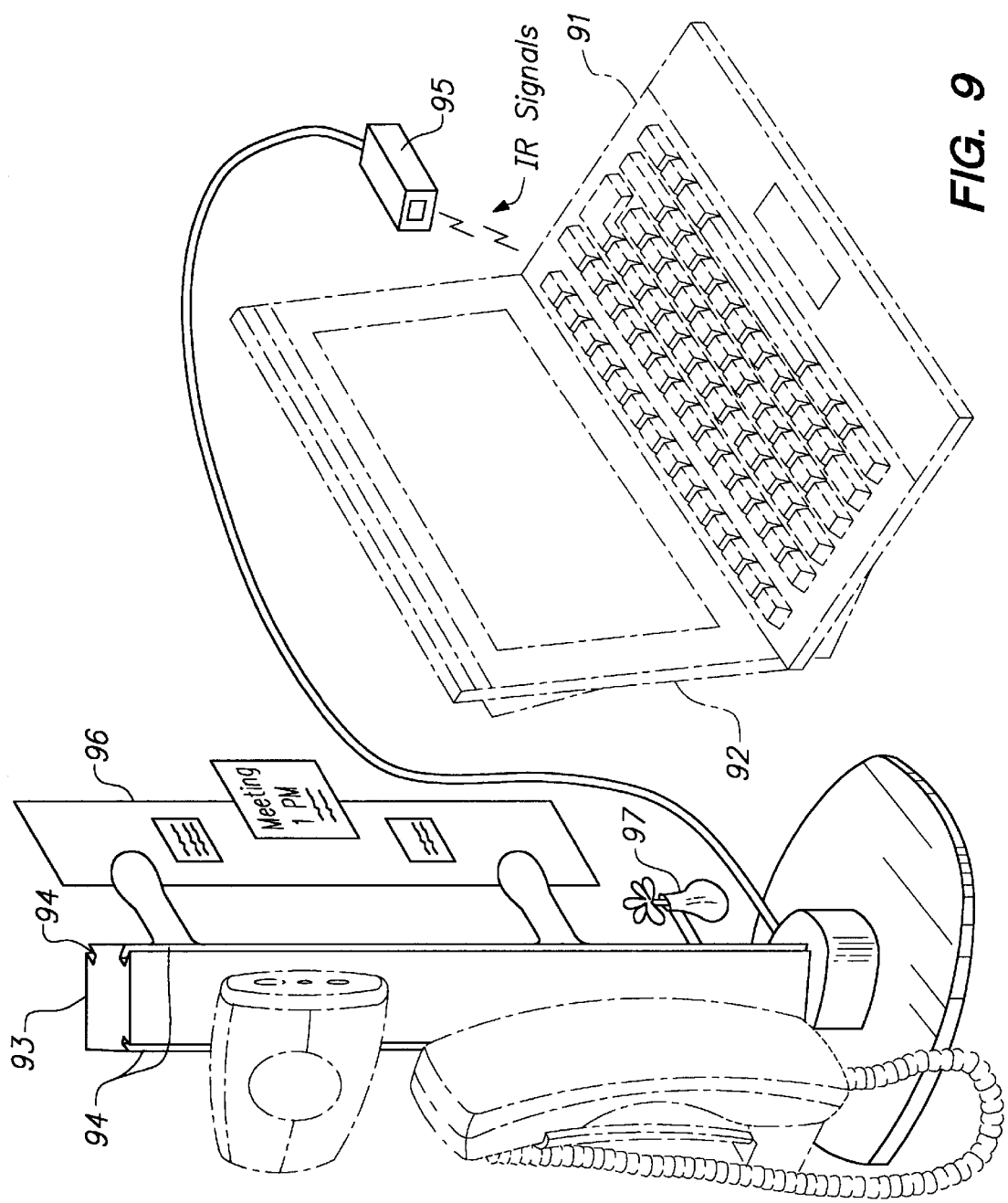

5,850,998

METHOD AND APPARATUS FOR MOUNTING AN ACCESSORY ON AN APPLIANCE

FIELD OF THE INVENTION

The present invention relates to the field of attaching one or more accessories to an appliance, where the accessories are intended to be used in close physical proximity or functional collaboration with the appliance. In particular, the invention pertains to attaching one or more accessories to an electronic display device such as a computer monitor.

BACKGROUND OF THE INVENTION

A variety of appliances are currently in use which can be used with improved functionality or convenience in conjunction with one or more accessories in business, home, and other applications. In many applications the accessories are best used when tightly coupled to the appliance. For example, various computers are often coupled with attendant accessories for a variety of applications. This is particularly true for modern multi-media computers, but often is seen in simply adding accessories to a traditional business or home computer. Other appliances which might be used in collaboration with tightly coupled accessories may include, for example, a television in conjunction with accessory speakers, a video input device such as a camera, e.g. for video conferencing, and perhaps a telephone.

In many applications, a computer may be used in conjunction with a variety of accessories. For example, referring to FIG. 1, a user might have a computer 20 and monitor 21, usually a keyboard 18 and pointing device such as mouse 19, plus one or more of a microphone 2, a video camera 13, a video conferencing camera 11, a camcorder 4, and a headset 15 integrating an earphone 15A and voice pickup 15B, a telephone 6, a modem 17, and external speakers 22. In current applications, each accessory comes with an independent mounting or positioning solution. For the most part, each accessory is intended for placement on a horizontal surface, such as a desktop or shelf. Speakers and telephones and larger video pickup devices are usually in this category. Some accessories, such as microphones and small video input devices, are designed to rest on top of a computer monitor.

In some instances, an accessory may be provided with a mounting solution to allow attaching the accessory directly to a vertical or horizontal surface such as an edge of a computer monitor. For example, certain accessories are packaged with a patch of hook-and-loop fabric, each side backed with adhesive, so that the accessory can be removably secured to a computer monitor, or other desired mounting location.

Each of the presently available mounting solutions suffer from a variety of disadvantages. For one, there is no universal or integrated solution, so each accessory vendor provides a different solution. As mentioned above, many accessories must be stabilized on a horizontal surface. In most installations, this uses valuable desk space. An ancillary difficulty of positioning accessories on a desktop is that the height may be inappropriate for optimal functioning of the accessory. For example, in some instances, speakers are best placed some distance above a desktop. For another example, most video input devices should be placed at approximately the level of a user's head, some significant distance above a desktop.

Mounting accessories on the top of a monitor also suffers from a variety of disadvantages. For example, most monitors include a substantial curved area and so lack large horizontal surfaces, so there is a limited space for positioning any accessory on a flat surface. Next, in most applications, a monitor will be tipped at some angle. In many instances, the angle of the monitor is changed from time to time. This is particularly true in a situation where different users share the same appliance. Such instances include a school or home or most any public access area, such as a library or information kiosk. These factors limit the available horizontal, or approximately horizontal, surface space but add the complication that the surface is not stable. If various accessories are balanced on such a surface, it may be quite difficult to keep them in position during any adjustment.

The issue of coordinating accessories with an appliance such as a computer display will become more acute as use of accessories becomes more commonplace. It is now common to provide speakerphone capabilities with a computer. This requires both speakers and a microphone, which beneficially are incorporated into or mounted close to a computer. However, often it is useful to be able to hold a private conversation. To this end, it would be helpful to have a telephone handset integrated with the computer as an alternative mode for telephonic communication. Video communication and conferencing is still in its infancy but within a short time a large number of computer users will use a video input device such as a small camera for routine communication and collaboration. For certain applications, a user may prefer to use a camcorder or other relatively heavy accessory in conjunction with the computer display.

Some computer vendors offer detachable connection solutions, but these address only some of the concerns described above. For example, the Hewlett-Packard Pavilion monitor and certain monitors available from Packard Bell provide for detachable speakers to the sides of a monitor. These solutions, however, provide only for the attachment of a single accessory, and at a single, predetermined position.

The issues described above may become increasingly relevant to other types of appliances, such as televisions. Common accessories for a television include a video cassette recorder (VCR), computer game player (and attendant joysticks, game pads, etc.), remote controls, auxiliary speakers, set top box and cable or other interface boxes. Some, but not all, of these accessories might be suitable for close integration with a television, while others may be useful only in general proximity to but not necessarily integrated with the television.

The present invention provides a mounting system that can be used with a variety of appliances and accessories to overcome these difficulties.

SUMMARY OF THE INVENTION

The present invention provides a plurality of mounting connections in close proximity to the appliance, and one or more appliances with a compatible, mating, mounting connection. In a preferred form, the mounting connections are integrated with the appliance and may take the form of a series of holes, or perhaps projections. In a particularly preferred form, the mounting connections are a series of holes arranged vertically and positioned in a recess such as a channel designed into the appliance so that the mounting connections are not a prominent aspect of the visual impact of the appliance, yet are readily available for securing an accessory. The channel can include at some point a wedge shape such as a chamfer. If corresponding accessories are designed with a corresponding shape, this can provide desirable distribution of forces as the accessory is fitted to or used with the appliance.

If the mounting connections are arranged symmetrically, accessories can be mounted on the right or left side at any of several heights allowed by the mounting connections. For example, one user might mount a telephone accessory on the right side of a computer, while another user might mount such a telephone on the left side of their own computer. In general, an accessory can be mounted on either side and perform appropriately. The height options are beneficial for mounting a variety of accessories, particularly a video camera. A video conferencing camera is preferably mounted at the user's eye level. The typical mounting position of a camera above the monitor results in an image looking down on the user which for most instances is rather unflattering to the user.

It is an object of this invention to provide a flexible mounting solution so that an accessory can be closely coupled to an appliance.

It is a further object of this invention to integrate the mounting solution with other design elements in order to maximize utility of the mounting but minimize any negative visual impact of the mounting solution.

It is a further object of this invention to allow positioning an accessory at a preferred one of several available optional positions in conjunction with the appliance.

It is a further object of this invention to allow positioning an accessory at a height appropriate for the function of that accessory for a particular user.

BRIEF DESCRIPTION OF THE DRAWINGS

FIG. 9 illustrates an alternate support for mounting accessories.

DETAILED DESCRIPTION OF THE INVENTION

The present invention provides a mounting mechanism on or near an appliance of interest and a compatible mounting mechanism on one or more accessories. The thrust of the invention is to allow positioning one or more appliances at a selected one of several possible positions in close proximity to the appliance. In one preferred embodiment, accessories are mounted to the appliance. In another preferred embodiment, accessories are mounted to a stand which is useful in connection with the appliance. The selection of materials and specific mounting mechanisms can be adapted to the nature of the specific accessories, including weight, size, potential number to be included in a single integrated group, and other factors well understood by one skilled in the art.

Figure 2:
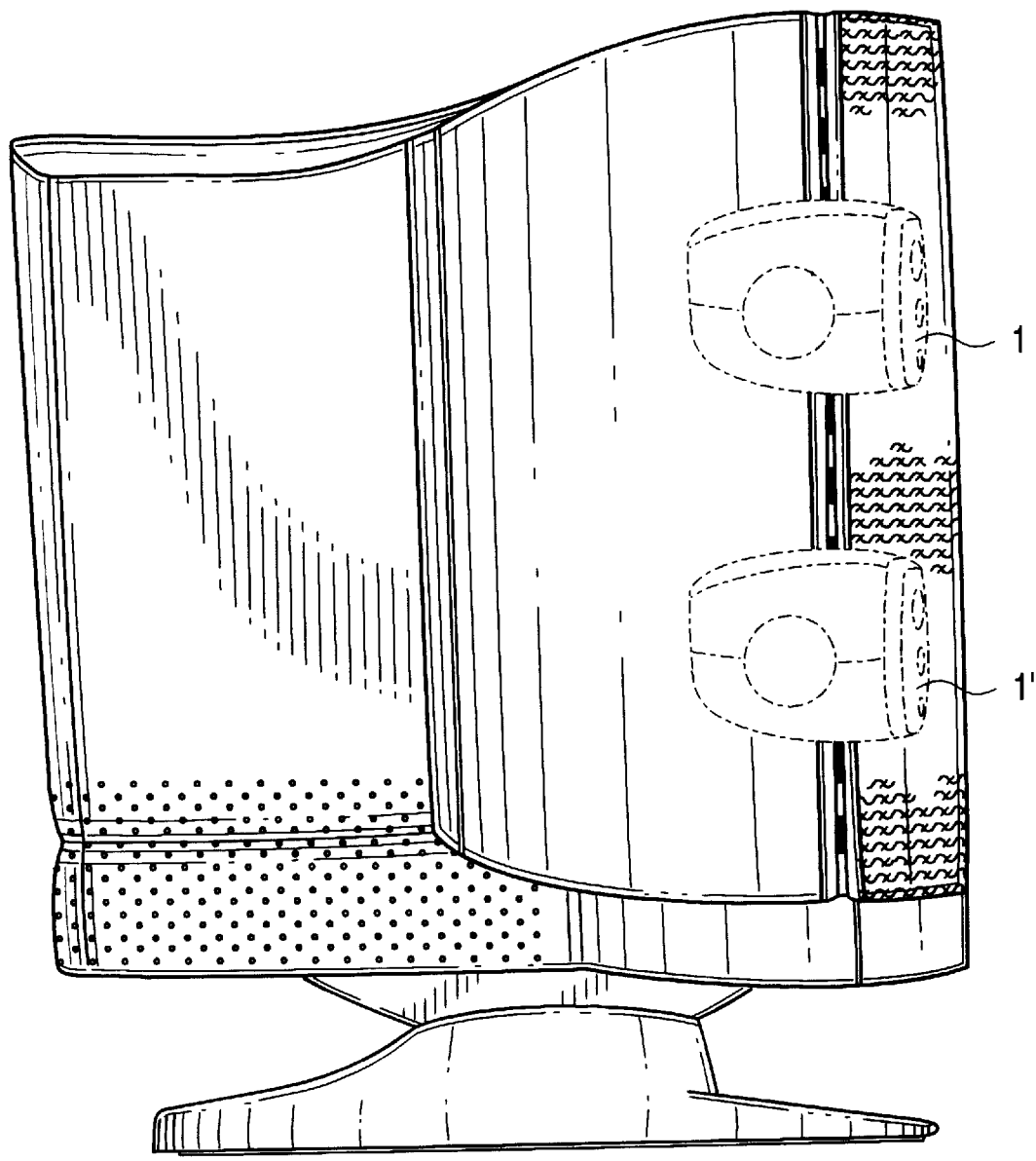
FIG. 2 illustrates a flexible mounting solution illustrating securing an accessory video camera to a monitor in accordance with the teachings of this invention.
Figure 3:
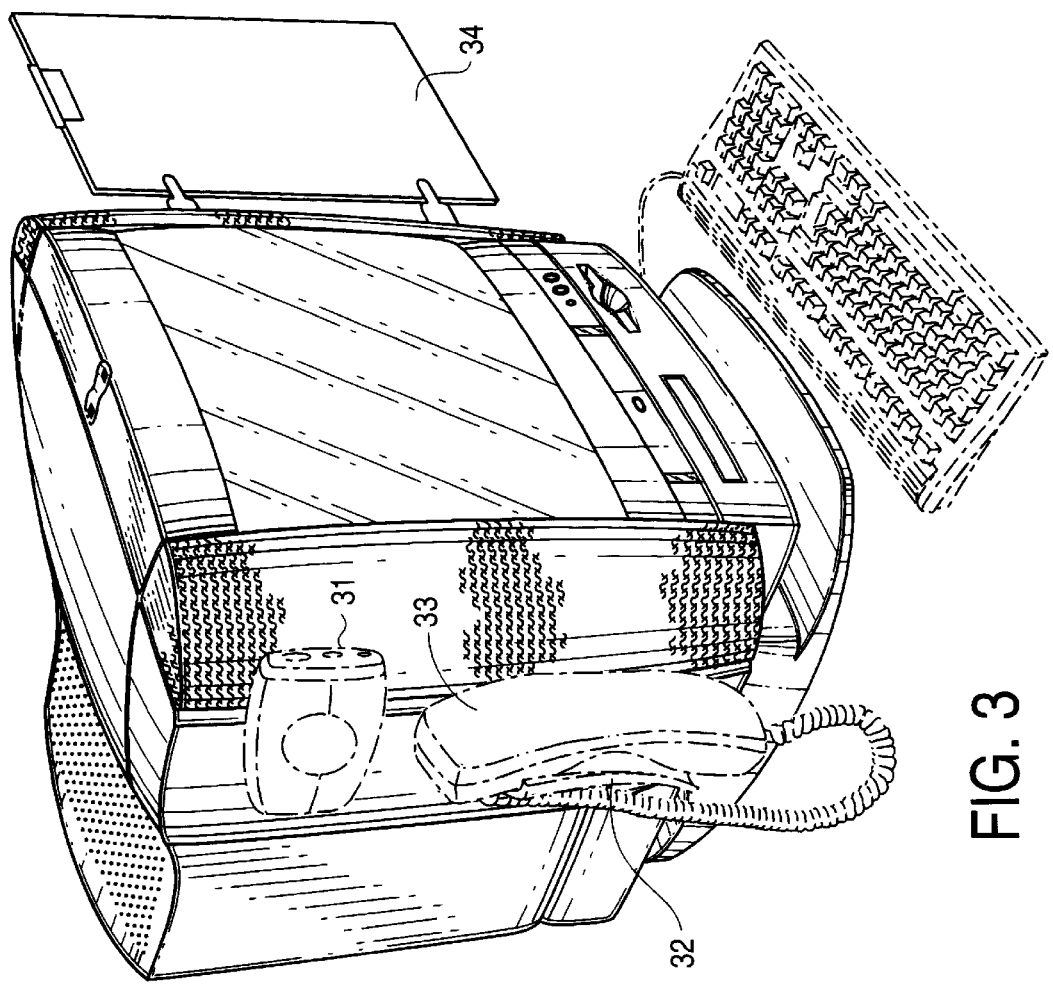
FIG. 3 illustrates a preferred embodiment of the present invention.

Referring to FIG. 2, one possible solution includes a series of holes within a groove where the groove is secured to the appliance and corresponding hooks on an accessory, enabling the accessory to be positioned at any one of a number of positions 1, 1'. Referring to FIG. 3, these principles can allow mounting of a variety of accessories to a selected appliance, including, for example, video camera 31, telephone handset support 32 and telephone handset 33, and document holder 34.

In one preferred embodiment, each side grove is fitted with a series of holes. Each hole is designed to fit in the normal width of a standard groove, which may, for example be about 1.3 mm wide. The standardized hole pattern and dimensions provides manufacturability advantages. For example, the holes can be molded partially in each of two mating elements such as a monitor housing and a front bezel. The exact point of meeting can be selected according to design criteria using methods well known in the art. These might include considerations of the material properties of plastic or other material forming each component of the groove. Selection of tooling is also important in that a mold tends to be designed to release a molded part along a principal axis. If the grooves and or holes can be included in the mold without interfering with this principal axis of release, then these features can be easily included in the product.

One skilled in the art will recognize that a variety of designs are possible for a mounting mechanism. For example, the appliance might have a series of holes, preferably in some sort of regular pattern. Alternatively, an appliance could be fitted with a series of pegs or knobs.

In a preferred embodiment, the mounting mechanism includes a series of slots secured to or integrated with the appliance. Providing a groove or slot provides some engineering advantages, as well as some aesthetic advantages. Incorporating a wedge along with the groove provides additional benefits.

Figure 4A:
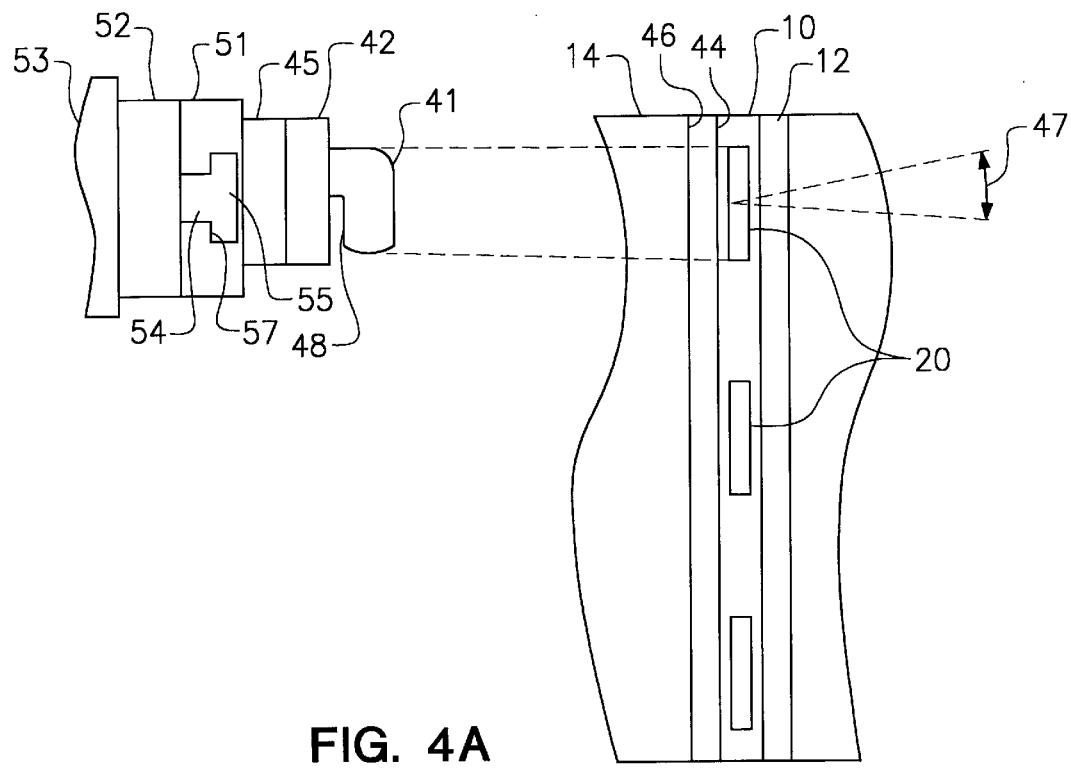
FIGS. 4A and 4B illustrate in detail the mounting mechanism of the embodiment of FIG. 3.
Figure 4B:
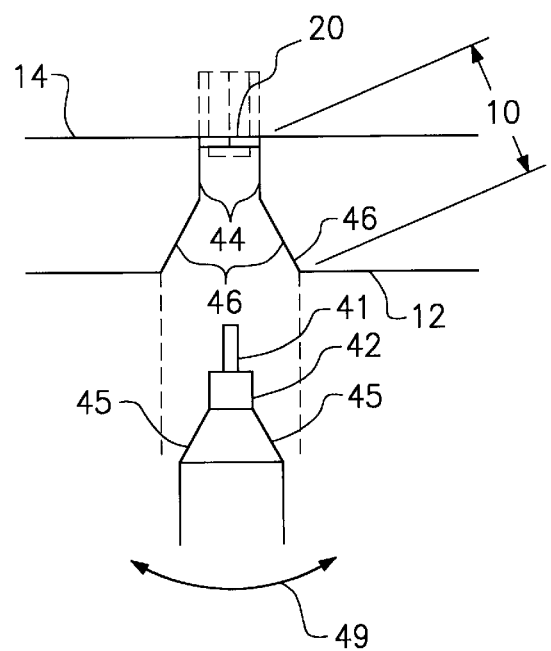

For example, in a computer monitor, a channel can be provided along the right and left sides of the monitor at an appropriate position. Referring to FIGS. 4A and 4B, groove 10 is provided between front bezel 12 and main housing 14 of a computer monitor 16. The groove might be formed in just one of the main housing 14 or front bezel 12, or part in each but, for example, including material from each to meet at the midpoint or some other section of the groove, or perhaps by portions of each overlapping in the groove section, providing, for example, additional rigidity. Depending on a specific design, it may be desirable to include a backing plate, perhaps of metal, behind the groove to provide some desired material properties, including perhaps strength or rigidity.

A series of slots 20 are disposed in evenly spaced fashion along the primary axis of groove 10. As hook 41 is inserted into slot 20, segment 42 is fitted into channel 44. Accessory wedge portion 45 moves into position against channel wedge portion 46. Hook 41 engages slot 20 so as to pull the accessory into the groove. In a preferred embodiment, hook 41 includes elements to secure the hook into place against the appliance. Gravity can pull the appliance down relative to the appliance, further securing the fit of the accessory to the appliance.

The wedge feature provides two advantages. First, during insertion of an accessory, the wedge provides a guide directing the hook into the channel, since the opening of the wedge is wider than the final channel dimension. Second, once the accessory is inserted, the wedge provides support and resistance against bending around the hook, shown by arrow 49, in an axis parallel to the channel but approximately flush with the edge of main housing 14 and/or front bezel 12. A wedge provides more material in the accessory itself to allow better distribution of forces within the accessory when compared with a straight, non-wedged accessory. If there is little or no wedge, there is correspondingly less material to resist bending stress around the axis of rotation, which could promote a failure or breakage at that point.

The angle and depth of the wedge portion need not be identical necessarily for all compatible appliances and devices. It is preferable that the angle be consistent among a series of compatible devices, but the depth of the wedge need not be identical. For example, an appliance may be designed with a wedge of a certain depth while a second appliance, or perhaps a stand as described below, may have a wedge of greater depth. As long as an accessory can fit in a compatible channel of the greatest depth, it will also fit in a correspondingly shallower channel or groove. One skilled in the art will understand a variety of dimensional selections that are encompassed in the teachings of the invention.

Accessory 53 may be connected directly to accessory wedge portion 45 so as to maintain the accessory in a fixed relationship with hook 41 and therefore with the appliance. In one preferred embodiment, accessory 53 is connected to hook 41 in a way to permit some flexibility in this connection. For example, accessory wedge portion 45 may be connected to hook pivot 51 which is coupled to accessory pivot 52 through shaft 54 and head 55. Shaft 54 and head 55 are secured to accessory pivot 52, for example by molding from a single piece of plastic, and rotate within chamber 57 in hook pivot 51. As another example, the pivot connection could be a ball and socket type connection to allow additional degrees of freedom. A locking mechanism may or may not be included, as desired.

An accessory might be mounted using a single hook, but two or more hooks provide additional support. In addition, providing at least two hooks sharply limits the possibility of rotating around a hook along an axis perpendicular to the channel, illustrated by arrow 47 where the axis of rotation is perpendicular to the plane of the drawing in this view.

Figure 5:
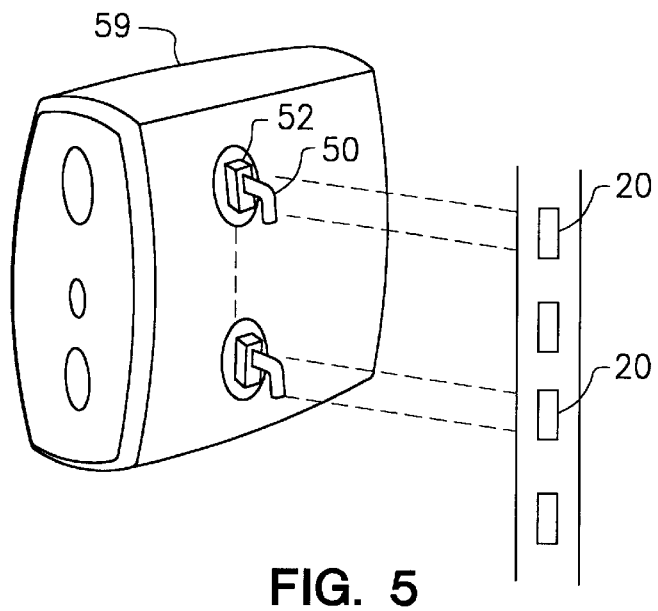
FIG. 5 illustrates a detailed view of the mounting mechanism for a video camera accessory.

Referring to FIG. 5, each hook 50 is attached through extension 52 to video camera 59. Each hook 50 is sized to fit into a corresponding slot 20 when inserted along an axis approximately orthogonal to the main axis of groove 10, then secured in position by moving hook 50 down relative to slot 20. This takes advantage of gravity to keep the accessory (video camera 59) securely attached to the appliance (monitor 16). If extension 52 provides some sort of rotational freedom, each hook 50 can be rotated by 180° and video camera 59 can be mounted on the right or left side of the appliance.

Figure 6:
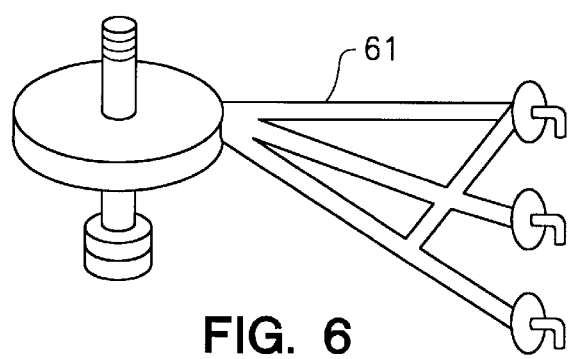
FIG. 6 illustrates a detailed view of the mounting mechanism for a generic, heavy accessory.

Referring to FIG. 6, another useful accessory provides a standard camera mount, similar to those found on a tripod or monopod. One preferred embodiment of accessory bracket 61 is reinforced to spread weight over three holes, but a similar accessory bracket could be designed using only two holes or with different reinforcing for selected applications to support a variety of loads. The connection to the accessory may be selectively or completely flexible, as in a typical camera tripod with mechanisms for selectively choosing various rotational positions. Such an accessory bracket is useful for mounting an arbitrary device such as a camera, camcorder, and the like.

Figure 7:
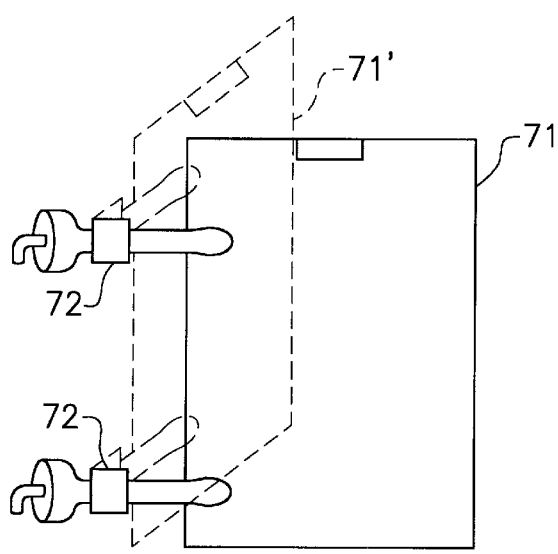
FIG. 7 illustrates an accessory with a hinge to move between a position for storage and a position for use.

Referring to FIG. 7, another useful accessory includes one or more hinges to allow rotation between positions. The illustrated device is a document holder that can be rotated at hinges 72 between working position 71 and stored position 71'. One skilled in the art will appreciate that a wide variety of accessories with many degrees of freedom can be designed to work with the present invention.

Figure 1:
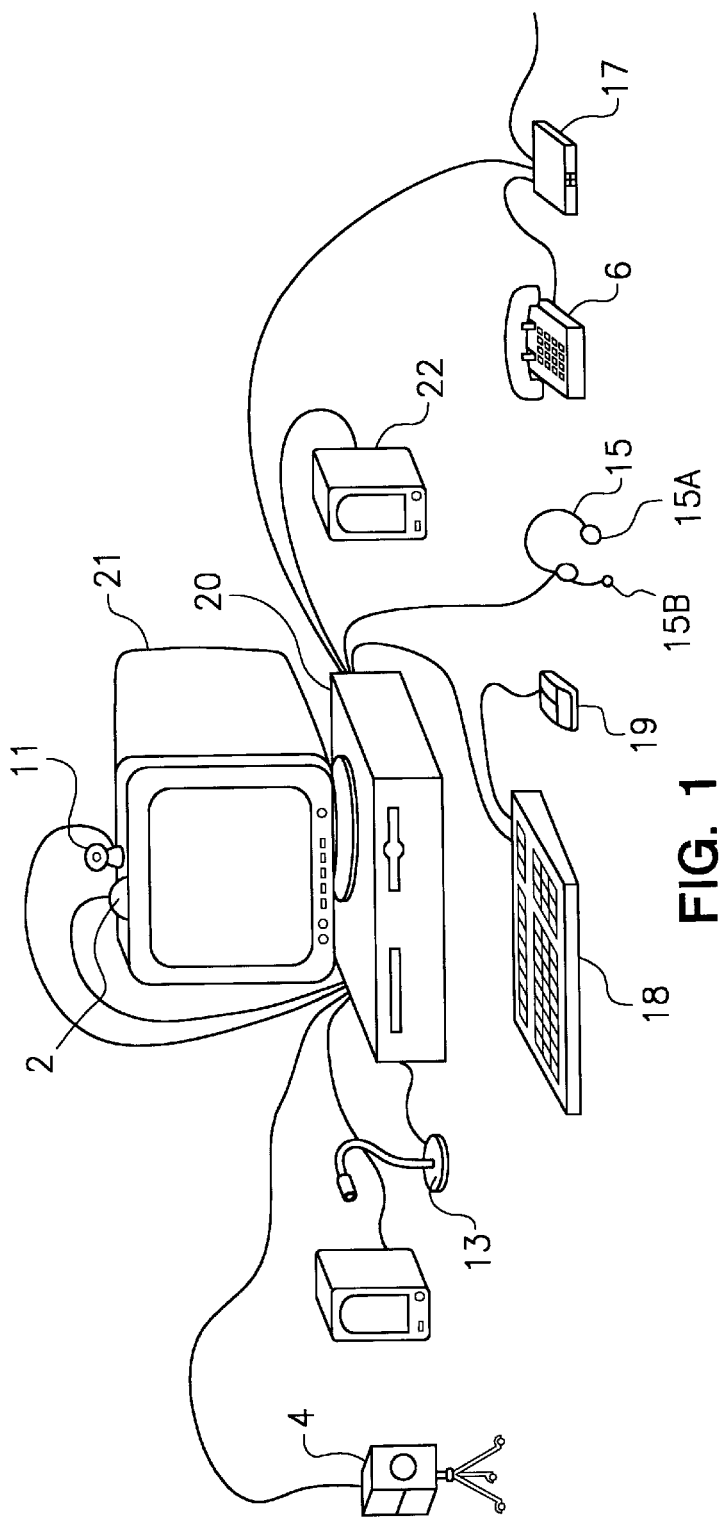
FIG. 1 illustrates a computer monitor and several related accessories positioned using prior art solutions.
Figure 8:
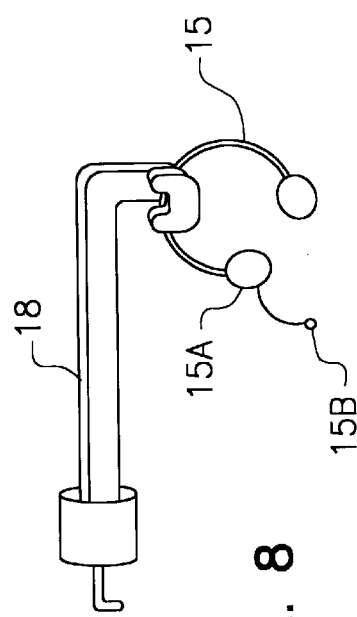
FIG. 8 illustrates an accessory for supporting another device.

Referring to FIG. 8, another useful accessory is holder 81 for a companion accessory, here headset 15 with earphones 15A and microphone 15B. A variety of useful support accessories can be designed by one skilled in the art. Referring also to FIG. 9, other useful accessories might include a simple board 96 for attaching sticky notes, a holder for an input device such as a mouse or remote control unit, a picture frame, a vase 97, or any number of other creative accessories.

The teachings of this invention can be useful even if the appliance does not itself include a stable, relatively vertical portion by using an accessory stand. Referring to FIG. 9, portable computer 91 is not designed to support the weight of any of these accessories, and the screen portion 92 may assume a variety of angles, many of which would be inappropriate for mounting an accessory. Stand 93 incorporates one or more channels 94 as described above to provide a means of securing one or more accessories as described above. Computer 91 can be coupled to accessories in a variety of ways including a docking station or infrared transceiver link 95, which may be wired in turn to appropriate accessories.

One skilled in the art understands how to modify the specific shape, sizing, and spacing of slots or hooks as needed for specific applications. One skilled in the art also understands that fitting an accessory with more hooks increases the area over which to distribute any loading. In addition, using more than one hook to secure an accessory provides some positional benefits, including effectively eliminating rotation of the accessory around an axis orthogonal to the groove.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the claims which follow.

We claim:

1. A mounting mechanism system comprising:
   an appliance,
   a first connection component having a channel wedge portion for use in conjunction with said appliance,
   an accessory,
   a second connection component connected to said accessory, said second connection component having a raised wedge portion suitable for securable connection to said first connection component such that said accessory is securably connected for use in conjunction with said appliance,
   wherein said first connection component comprises a plurality of slots arranged in a line regularly spaced,
   wherein said second connection component comprises a hook to fit in a first slot of said plurality of slots.

2. The mounting mechanism of claim 1 wherein said second connection component further comprises a second hook to fit in a second slot of said plurality of slots.

3. A mounting mechanism for using an accessory with an appliance, said mounting mechanism comprising:

a first connection component having a plurality of mounting positions, each mounting position includes a channel wedge portion for use in conjunction with said appliance, and a second connection component connected to said accessory having a raised wedge portion suitable for securable connection to said first connection component at a channel wedge portion of a selected mounting position such that said accessory is securably connected for use in conjunction with said appliance, wherein said first connection component comprises a plurality of slots, wherein said second connection includes a first raised wedge portion having a first hook to fit in a first slot of said plurality of slots for securing a connection with a first channel wedge portion of the plurality of mounting positions.

4. The mounting mechanism of claim 3, wherein said second connection includes a second raised wedge portion having a second hook to fit in a second slot of said plurality of slots for securing a connection with a second channel wedge portion of the plurality of mounting positions.

* * * * *